United States Patent
Li et al.

(10) Patent No.: US 12,495,205 B2
(45) Date of Patent: Dec. 9, 2025

(54) APPARATUS AND METHOD TO CORRECT THE ANGLE AND LOCATION OF THE CAMERA

(71) Applicant: QUALCOMM Incorporated, San Diego, CA (US)

(72) Inventors: Zhiguo Li, Beijing (CN); Nan Zhang, Beijing (CN); Yongjun Xu, Beijing (CN); Zhe Li, Hopkinton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/299,293

(22) PCT Filed: Dec. 28, 2018

(86) PCT No.: PCT/CN2018/124816
§ 371 (c)(1),
(2) Date: Jun. 2, 2021

(87) PCT Pub. No.: WO2020/133204
PCT Pub. Date: Jul. 2, 2020

(65) Prior Publication Data
US 2022/0053143 A1 Feb. 17, 2022

(51) Int. Cl.
| | |
|---|---|
| H04N 5/232 | (2006.01) |
| G06F 18/22 | (2023.01) |
| G06K 9/62 | (2022.01) |
| G06V 10/75 | (2022.01) |
| H04N 23/60 | (2023.01) |
| H04N 23/63 | (2023.01) |

(52) U.S. Cl.
CPC ........... *H04N 23/633* (2023.01); *G06F 18/22* (2023.01); *G06V 10/7515* (2022.01); *H04N 23/632* (2023.01); *H04N 23/64* (2023.01)

(58) Field of Classification Search
CPC .. G06K 9/6201; G06K 9/6215; A61B 6/5241; A61B 1/00045; A61B 1/0002;
(Continued)

(56) References Cited

U.S. PATENT DOCUMENTS

| | | | |
|---|---|---|---|
| 9,626,589 B1* | 4/2017 | Graham | ................ G06V 10/24 |
| 2011/0058749 A1* | 3/2011 | Cooper | ................ H04N 13/111 |
| | | | 382/218 |

(Continued)

FOREIGN PATENT DOCUMENTS

| | | |
|---|---|---|
| CN | 102194230 A | 9/2011 |
| CN | 103020086 A | 4/2013 |

(Continued)

OTHER PUBLICATIONS

International Search Report and Written Opinion—PCT/CN2018/124816—ISA/EPO—dated Sep. 19, 2019.

*Primary Examiner* — Xi Wang
(74) *Attorney, Agent, or Firm* — QUALCOMM Incorporated (57) ABSTRACT

A user may select an image of a scene captured by a mobile device as a reference image. The mobile device may present the reference image as a translucent background image on a display of the mobile device, and may display a preview image of the scene over the translucent background image so that the user can adjust a position and/or an orientation of the mobile device until the preview image is aligned with the translucent background image. In some aspects, the mobile device may determine a similarity value between the preview image and the translucent background image, and may present the similarity value on the display.

23 Claims, 7 Drawing Sheets

(58) Field of Classification Search
CPC ............... A61B 1/00009; A61B 1/041; G06T 2207/30092; G06T 2207/300004; G06T 2207/10068; G06T 2207/10016; G06T 7/0016; H04N 1/00161; H04N 5/23293; H04N 5/23222; H04N 5/232935
USPC .................................................... 348/333.11
See application file for complete search history.

(56) References Cited

U.S. PATENT DOCUMENTS

2013/0155280 A1* 6/2013 Donatelli et al. ............................ H04N 51/00161
2015/0324983 A1* 11/2015 Takasugi ............ A61B 1/00009 382/128
2016/0366340 A1* 12/2016 Okamoto et al. ............................ H04N 5/232293 348/333.11

FOREIGN PATENT DOCUMENTS

| CN | 103372715 A | 10/2013 |
| CN | 103999447 A | 8/2014 |
| CN | 104038700 A | 9/2014 |
| CN | 104135609 A | 11/2014 |
| CN | 104902800 A | 9/2015 |
| CN | 105809620 A | 7/2016 |
| CN | 106101522 A | 11/2016 |
| JP | 2010142287 A | 7/2010 |
| JP | 2012044581 A | 3/2012 |
| JP | 2018014579 A | 1/2018 |

* cited by examiner

APPARATUS AND METHOD TO CORRECT THE ANGLE AND LOCATION OF THE CAMERA

CROSS-REFERENCE TO RELATED APPLICATION

This application is a U.S. national stage application under 35 U.S.C. § 371 of International Application No. PCT/CN2018/124816, filed Dec. 28, 2018, the entire disclosure of which is incorporated herein by this reference thereto.

TECHNICAL FIELD

This disclosure relates generally to mobile devices, and specifically to assisting a user to determine a vantage point from which a selected image of a scene was captured.

DESCRIPTION OF THE RELATED TECHNOLOGY

Many cameras provide a number of auxiliary functions that can assist users when taking pictures. These auxiliary functions may include providing crossed horizon and vertical lines to help the user to distribute objects presented on the camera's display, and may also include providing a level to help ensure that the camera is horizontally aligned with a scene when capturing images of the scene.

A user may want to capture a number of images of a scene from the same vantage point from which a previous image was captured of the scene. For one example, after capturing an image of a scene from a specific vantage point, the user may notice unwanted objects in the captured image (such as a passing car) and may want to re-capture the same scene from the same vantage point (without the unwanted objects). For another example, a user may capture a plurality of low-dynamic range (LDR) images of a scene from the same vantage point and then combine the plurality of LDR images to generate a high-dynamic range (HDR) image of the scene.

Thus, it would be desirable for a mobile device to assist a user in determining the specific vantage point from which an image of a scene was captured, for example, so that the user can capture additional images of the scene from the same vantage point.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for capturing images using a mobile device. The method can include selecting an image of a scene as a reference image, presenting the reference image as a translucent background image on a display of the mobile device, displaying a preview image of the scene over the translucent background image presented on the display, and determining a similarity value between the preview image and the translucent background image. The method can also include adjusting an alignment between the preview image and the translucent background image based on changes in position and orientation of the mobile device, and dynamically updating the similarity value based on the adjusted alignment. In addition, or in the alternative, the method can include automatically capturing the preview image based on the similarity value exceeding a threshold value.

In some implementations, the similarity value can include a horizontal similarity value, a vertical similarity value, and a rotational similarity value. The horizontal similarity value may indicate a horizontal offset between the preview image and the translucent background image, the vertical similarity value may indicate a vertical offset between the preview image and the translucent background image, and the rotational similarity value may indicate a rotational offset between the preview image and the translucent background image. In some aspects, the method can include presenting one or more of a horizontal directional indicator, a vertical directional indicator, and a rotational indicator on the display to assist the user in aligning the preview image with the translucent background image. The horizontal directional indicator may be based on the horizontal similarity value, the vertical directional indicator may be based on the vertical similarity value, and the rotational indicator may be based on the rotational similarity value.

Another innovative aspect of the subject matter described in this disclosure can be implemented in a mobile device. The mobile device can include a display, one or more processors, and a memory storing instructions. Execution of the instructions by the one or more processors can cause the mobile device to select an image of a scene as a reference image, to present the reference image as a translucent background image on the display, to display a preview image of the scene over the translucent background image presented on the display, and to determine a similarity value between the preview image and the translucent background image. Execution of the instructions by the one or more processors can also cause the mobile device to adjust an alignment between the preview image and the translucent background image based on changes in position and orientation of the mobile device, and to dynamically update the similarity value based on the adjusted alignment. In addition, or in the alternative, execution of the instructions by the one or more processors can also cause the mobile device to automatically capture the preview image based on the similarity value exceeding a threshold value.

In some implementations, the similarity value can include a horizontal similarity value, a vertical similarity value, and a rotational similarity value. The horizontal similarity value may indicate a horizontal offset between the preview image and the translucent background image, the vertical similarity value may indicate a vertical offset between the preview image and the translucent background image, and the rotational similarity value may indicate a rotational offset between the preview image and the translucent background image. In some aspects, execution of the instructions by the one or more processors can cause the mobile device to present one or more of a horizontal directional indicator, a vertical directional indicator, and a rotational indicator on the display to assist the user in aligning the preview image with the translucent background image. The horizontal directional indicator may be based on the horizontal similarity value, the vertical directional indicator may be based on the vertical similarity value, and the rotational indicator may be based on the rotational similarity value.

Another innovative aspect of the subject matter described in this disclosure can be implemented in a non-transitory computer-readable medium. The non-transitory computer-readable medium can store one or more programs containing instructions that, when executed by one or more processors of an apparatus, can cause the apparatus to perform a number of operations. In some implementations, the number of operations can include selecting an image of a scene as a reference image, presenting the reference image as a translucent background image on a display of the apparatus, displaying a preview image of the scene over the translucent background image presented on the display, and determining a similarity value between the preview image and the translucent background image. The number of operations can also include adjusting an alignment between the preview image and the translucent background image based on changes in position and orientation of the apparatus, and dynamically updating the similarity value based on the adjusted alignment. In addition, or in the alternative, the number of operations can include automatically capturing the preview image based on the similarity value exceeding a threshold value.

In some implementations, the similarity value can include a horizontal similarity value, a vertical similarity value, and a rotational similarity value. The horizontal similarity value may indicate a horizontal offset between the preview image and the translucent background image, the vertical similarity value may indicate a vertical offset between the preview image and the translucent background image, and the rotational similarity value may indicate a rotational offset between the preview image and the translucent background image. In some aspects, execution of the instructions can cause the apparatus to present one or more of a horizontal directional indicator, a vertical directional indicator, and a rotational indicator on the display to assist the user in aligning the preview image with the translucent background image. The horizontal directional indicator may be based on the horizontal similarity value, the vertical directional indicator may be based on the vertical similarity value, and the rotational indicator may be based on the rotational similarity value.

Another innovative aspect of the subject matter described in this disclosure can be implemented in an apparatus. The apparatus can include means for selecting an image of a scene as a reference image, means for presenting the reference image as a translucent background image on a display of the apparatus, means for displaying a preview image of the scene over the translucent background image presented on the display, and means for determining a similarity value between the preview image and the translucent background image. The apparatus can also include means for adjusting an alignment between the preview image and the translucent background image based on changes in position and orientation of the apparatus, and means for dynamically updating the similarity value based on the adjusted alignment. In addition, or in the alternative, the apparatus can include means for automatically capturing the preview image based on the similarity value exceeding a threshold value.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Implementations of the subject matter described in this disclosure may assist a user when positioning a mobile device to capture images of a scene from a specific vantage point (such as from a specific distance, location, and/or angle). In some implementations, the user may wish to determine the specific vantage point from which an image of the scene was previously captured so that additional images of the scene can be captured from the same vantage point at a later time. In some aspects, the user may capture additional images of the scene from the specific vantage point to remove one or more undesirable objects (such as a passing car or person) from the images. In other aspects, the user may capture additional images of the scene from the specific vantage point using different exposure values to create an HDR image of the scene from a plurality of LDR images of the scene.

In some implementations, the user may select or designate a previously captured image of a scene from a specific vantage point as a reference image, and the mobile device may present the reference image as a translucent background image on a display of the mobile device. The mobile device may display a preview image of the scene (or a succession of preview image frames) over the translucent background image so that the user can adjust a position and/or orientation of the mobile device until the preview image is aligned with the translucent background image (and thus aligned with the vantage point from which the reference image was captured). In some aspects, the user may be prompted to capture an image of the scene when a degree of similarity or correlation between the preview image and the translucent background image exceeds a threshold value. In other aspects, the mobile device may automatically capture one or more images of the scene when the degree of similarity or correlation between the preview image and the translucent background image exceeds the threshold value. In addition, or in the alternative, the degree of similarity or correlation between the preview image and the translucent background image may be used to determine the specific vantage point from which the reference image of the scene was captured.

In some implementations, the mobile device may compare the preview image with the reference image to generate a similarity value indicative of a degree of similarity or correlation between the preview image and the translucent background image. The similarity value may be presented on the display of the mobile device to assist the user in aligning the preview image with the translucent background image (such as by changing the position and/or orientation of the mobile device until the similarity value exceeds the threshold value). In some implementations, the similarity value may be presented to the user as a single similarity value on the display. In other implementations, the similarity value may be presented to the user as multiple similarity values on the display. In some aspects, the multiple similarity values may include one or more of a horizontal similarity value, a vertical similarity value, and a rotational similarity value. In other aspects, the multiple similarity values may include one or more other suitable similarity values (such as a distance similarity value).

In the following description, numerous specific details are set forth such as examples of specific components, circuits, and processes to provide a thorough understanding of the present disclosure. The term "coupled" as used herein means connected directly to or connected through one or more intervening components or circuits. As used herein, the terms "translucent background image" and "translucent background" may refer to a translucent image that is presented as a background on a display, and thus the terms "translucent background image" and "translucent background" may be used interchangeably herein. Also, in the following description and for purposes of explanation, specific nomenclature is set forth to provide a thorough understanding of the example implementations. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
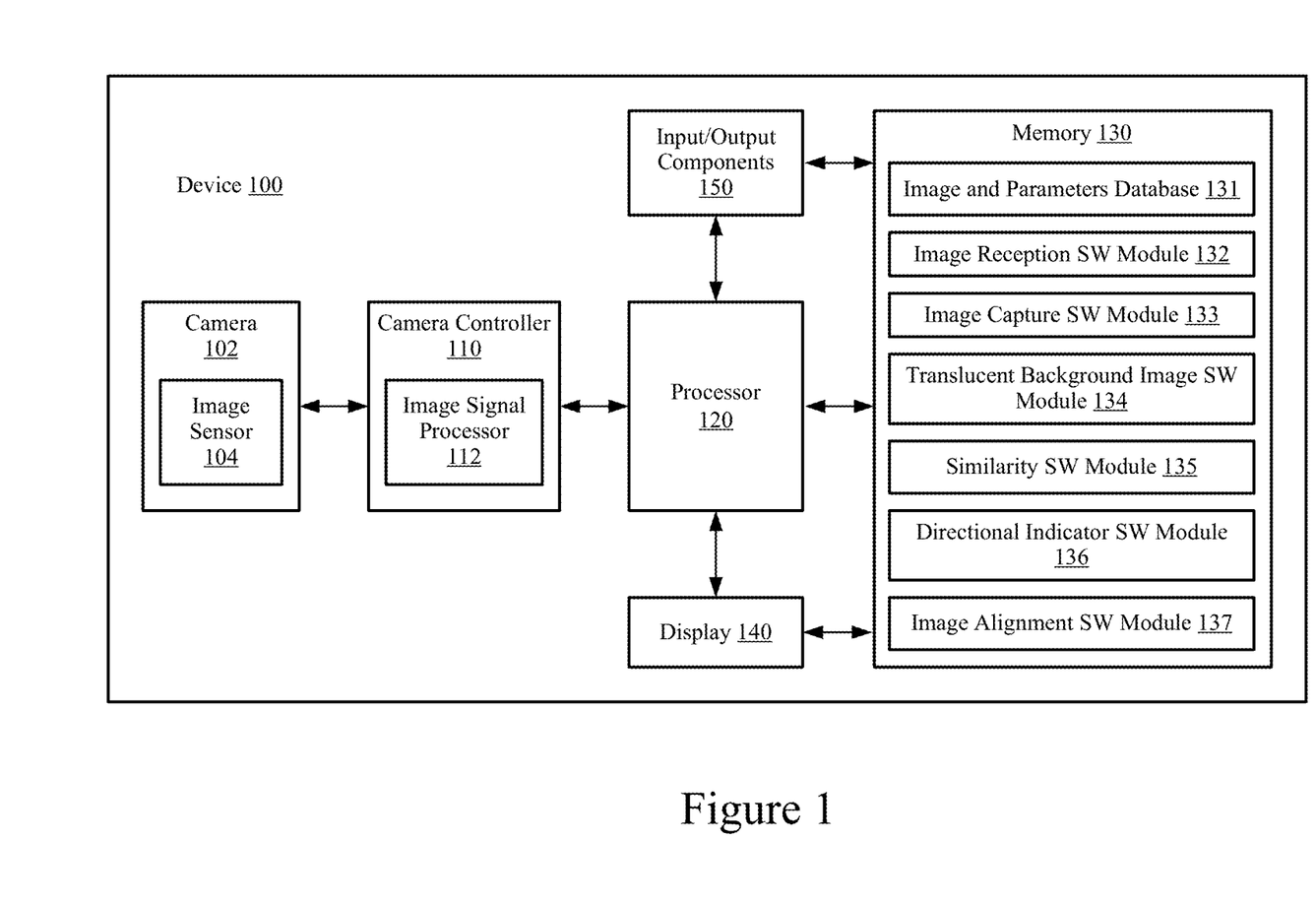
FIG. 1 is a block diagram of an example device within which aspects of the present disclosure may be implemented.

FIG. 1 is a block diagram of an example device 100 within which various aspects of the present disclosure may be implemented. In some implementations, the device 100 may be a mobile device such as, for example, a smartphone, tablet computer, laptop computer, personal digital assistant, or the like. In some other implementations, the device 100 may be a stationary device such as, for example, a desktop computer, a security camera, a fixed digital camera, or the like.

The device 100 may include a camera 102, a camera controller 110, a processor 120, a memory 130, a display 140, and any number of input/output (I/O) components 150. The camera 102, which is shown to include an image sensor 104, may be used for capturing images or video. The images or video captured by the camera 102 (such as by using the image sensor 104) may be processed by one or more components of the device 100 including, for example, the camera controller 110 or the processor 120. In some implementations, the image sensor 104 may include one or more color filter arrays (CFAs) arranged on a surface of the respective sensors. In other implementations, the image sensor 104 may include arrays of solid state sensor elements such as complementary metal-oxide semiconductor (CMOS) sensor elements. In some other implementations, the image sensor 104 may include other suitable types of image sensors for capturing images.

Although the device 100 is shown in FIG. 1 as including only one camera 102, in other implementations, the device 100 may include any suitable number of cameras that may be arranged in any suitable configuration. For implementations in which the device 100 includes multiple cameras, the multiple cameras may have similar or different capabilities (such as resolution, color or black and white, a wide view lens versus a telephoto lens, zoom capabilities, and so on), and may be positioned on any suitable face (such as the front face or the back face) of the device 100.

The camera controller 110, which may control operation of the camera 102 and the image sensor 104, is shown to include an image signal processor 112 that may process captured images or video provided by the camera 102. In some implementations, the image signal processor 112 may execute instructions from a memory (such as instructions stored in the memory 130 or instructions stored in a separate memory coupled to the image signal processor 112) to control operation of the camera 102, and/or may execute instructions from the memory to process one or more images or video provided by the camera 102 (such as generating a translucent image based on a reference image, processing the translucent image for presentation as a translucent background on the display 140, combining a number of LDR images of a scene to create an HDR image of the scene, and so on). The processed images or video may be stored in a memory (such as the memory 130), may be presented to a user for viewing on the display 140, or both. In some implementations, images generated by the camera 102 or received by the device 100 may be presented on the display 140 as a preview image for viewing by the user. In some aspects, the device 100 may capture the preview image and store the captured preview image in the memory 130.

In some other implementations, the image signal processor 112 may include specific hardware to control operation of the camera 102 and/or to process one or more images or video (such as by generating a translucent image based on a reference image). The image signal processor 112 may alternatively or additionally include a combination of specific hardware and the ability to execute software instructions. Further, although not shown in FIG. 1 for simplicity, the image signal processor 112 may include one or more image processing cores (such as a video encoding core), one or more image compression cores, or both.

The display 140 may be any suitable display or screen allowing for user interaction and/or to present items (such as captured images, video, or a preview image) for viewing by the user. In some implementations, the display 140 may be a suitable type of touch-sensitive display.

The I/O components 150 may be or may include any suitable mechanism, interface, or device to receive input (such as commands) from the user and to provide output to the user. For example, the I/O components 150 may include (but are not limited to) a graphical user interface, keyboard, mouse, microphone and speakers, and so on. In some implementations, the display 140 or the I/O components 150 (or both) may receive user input for selecting or adjusting one or more settings of the camera controller 110 and/or for selecting or adjusting one or more settings of the camera 102.

In some implementations, the image sensor 104 provided in the camera 102 may capture a limited range of brightness or light intensity when generating or capturing an image of a scene. A conventional image captured with a limited or standard range of brightness is called a limited-dynamic range (LDR) image or a standard-dynamic range (SDR) image. For example, the device 100 may capture an LDR or SDR image using an automatically determined exposure value (such as an auto-exposure (AE) setting) and an undesirably limited range of brightness captured for the captured image. Thus, although a person is able to perceive a large range of brightness and light effects of a scene (such as shadows and color contrasts), a captured LDR or SDR image may appear muted or dull because of its limited range of brightness. To compensate for the limited range of brightness associated with such captured images, many digital cameras perform high-dynamic range (HDR) imaging for capturing images.

For HDR imaging, multiple LDR or SDR images may be captured with different exposure values, and the captured images may be combined to create an HDR image that includes capture information for a larger range of exposures than any of the individual LDR or SDR images. More specifically, the device 100 may capture multiple LDR or SDR images having different exposures (and thus different ranges of brightness), and then combine (such as by blending, mixing, and/or merging) at least some portions of the multiple LDR images to generate an HDR image. By combining multiple LDR images having different exposures and ranges of brightness, the resulting HDR image may have a larger range of brightness than any of the individual LDR images.

To capture different ranges of brightness for multiple LDR images, a digital camera sensor may capture the multiple LDR images using different exposure values. Exposure values (EV) may be expressed in terms of f-values or stops, and may be measured as an amount of brightness for a unit of area (such as in units of candelas per square feet ($cd/ft^2$) or candelas per square meter ($cd/m^2$)). One stop above or more refers to a doubling of the amount of light received by a camera sensor (such as $2*x$ $cd/ft^2$), and one stop below or less refers to a halving of the amount of light received by the camera sensor (such as $x/2$ $cd/ft^2$). A device may adjust an exposure value (and thus the amount of light measured by a camera sensor) by adjusting the camera shutter speed, adjusting the camera sensor sensitivity (such as measured in ISO), and/or adjusting the camera aperture size.

In some implementations, the device 100 may automatically determine an exposure value for capturing a LDR image (such as an auto-exposure (AE) setting). The AE setting may be used to adjust the camera settings so that an image to be captured will have a target brightness. For example, when the image sensor 104 is activated, information from the image sensor 104 may be used to generate a preview stream including a plurality of preview images. Measurements from the preview stream (such as color contrast, measured brightness, and so on) may be used by the device 100 to determine initial settings for capturing an image. In some implementations, the preview stream may be presented on the display 140 to assist a user in determining the vantage point from which a reference image of the scene was captured. In addition, or in the alternative, the preview stream may be presented on the display 140 to assist the user in changing one or more of the camera settings. In some aspects, a default exposure value (such as a default stop) may be set so that the device 100 captures a LDR image with an overall target brightness. The device 100 may recursively measure the brightness of a preview image and adjust the exposure value (by adjusting one or more camera settings) until the measured brightness of the preview image equals the target brightness for the LDR image to be captured. For example, a simple average of the pixel brightness for each pixel of the preview image may be used in determining the exposure value.

In some implementations, the user may select a previously captured image of a scene as a reference image, and the device 100 may present the reference image as a translucent background image on the display 140 while also presenting a preview image of the scene on the display 140. In some aspects, the preview image may be presented on the display 140 over the translucent background image to assist the user in adjusting the position and/or orientation of the device 100 until a degree of similarity or correlation between the preview image and the translucent background image exceeds a threshold value.

The device 100 may present, on the display 140, a similarity value indicative of a degree of similarity or correlation between the preview image and the translucent background image. In some aspects, the device 100 may dynamically adjust the similarity value presented on the display 140 based on changes in the position and/or orientation of the device 100, for example, to assist the user in aligning the preview image with the translucent background image presented on the display 140. The threshold value may be selected such that when the similarity value exceeds the threshold value, the preview image may be sufficiently aligned with the translucent background image to allow the user to determine the specific vantage point from which the selected reference image was captured. In this manner, the user may capture additional images of the scene using the same vantage point from which the reference image was captured. In some aspects, the position and orientation of the device 100 may be stored or locked when the similarity value exceeds the threshold value, for example, so that additional images of the scene can be captured using different exposure values (and then combined to generate an HDR image of the scene).

The device 100 may include additional features or components not shown in FIG. 1 for simplicity. For example, a wireless interface, which may include one or more transceivers and baseband processors, may be included for a wireless communication device. Additionally, the device 100 may include or may be coupled to additional cameras other than the camera 102. The disclosure should not be limited to any specific examples or illustrations, including the example device 100.

The memory 130 may include an image and parameters database 131 to store images or video captured by the camera 102, to store images or video generated by the image sensor 104, and/or to store images or video provided by another device. The image and parameters database 131 may also store any number of parameters for use in processing images or video. In some implementations, the image and parameters database 131 may store, for each of a number of scenes, one or more reference images selected by a user. One or more camera settings (such as exposure values) used to capture the reference images may also be stored in the image and parameters database 131. The reference images stored in the image and parameters database 131 may be presented as a translucent background image on the display 140 of the device 100.

Figure 7:
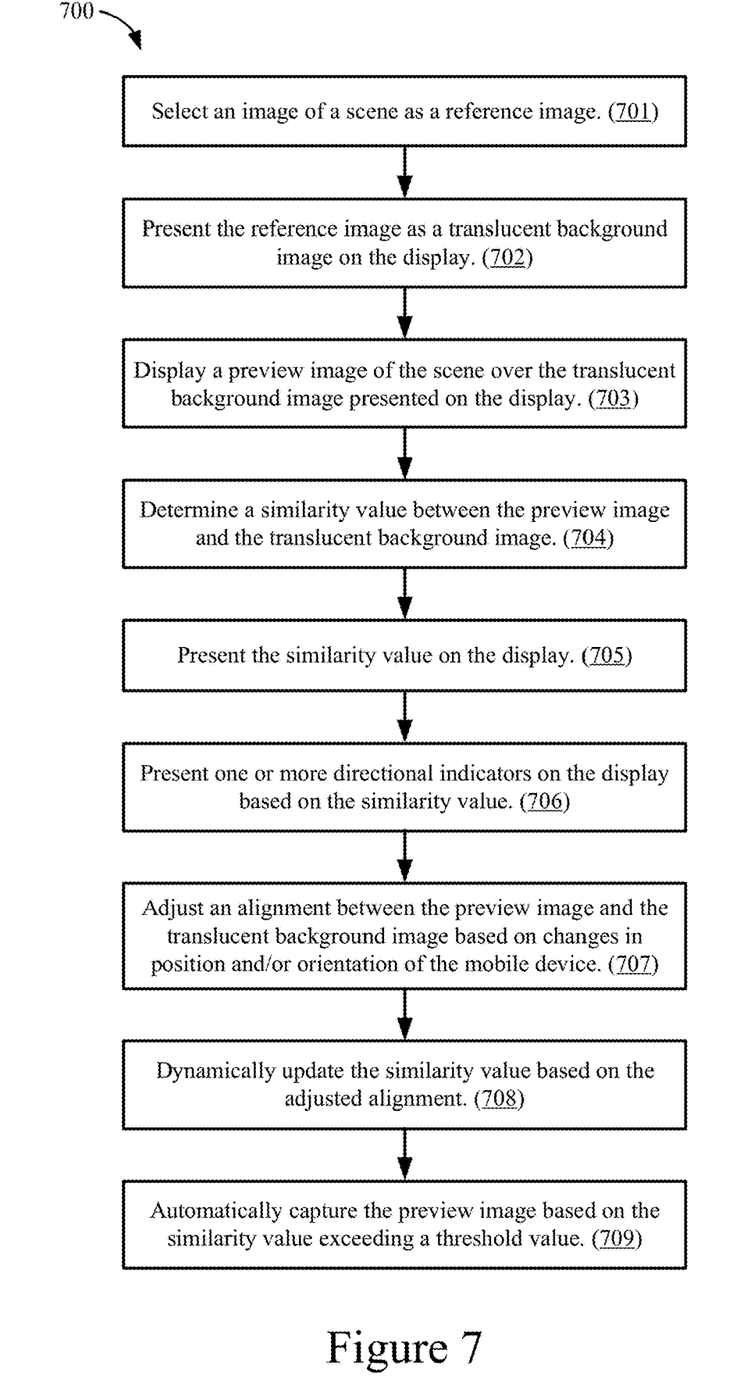
FIG. 7 is an illustrative flow chart depicting an example operation for capturing an image of a scene.

The memory 130 may include a non-transitory computer-readable medium (e.g., one or more nonvolatile memory elements, such as EPROM, EEPROM, Flash memory, a hard drive, and so on) that may store at least the following software (SW) modules:

- an image reception SW module 132 to receive images provided by the camera 102, to receive images provided by another device, and/or to generate one or more preview images of a scene (such as described for one or more operations of FIG. 7);
- an imaging SW module 133 to capture and process images provided by the camera 102, to capture and process preview images sensed by the image sensor 104, and to generate an HDR image based on a number of LDR images captured or provided by the camera 102 (such as described for one or more operations of FIG. 7);
- a translucent background image SW module 134 to generate a translucent image, based on a reference image, for presentation as a translucent background on the display 140 (such as described for one or more operations of FIG. 7);
- a similarity SW module 135 to determine a similarity value between a preview image presented on the display 140 and a reference image presented as a translucent background image on the display 140, and to dynamically adjust the similarity value based on changes in position and/or orientation of the camera 102 relative to the scene (such as described for one or more operations of FIG. 7);
- a directional indicator SW module 136 to generate a number of directional indicators for presentation on the display 140, for example, to assist a user in aligning the preview image with the translucent background image presented on the display 140 (such as described for one or more operations of FIG. 7); and
- an image alignment SW module 137 to adjust an alignment between the preview image and the translucent background image presented on the display 140 based on changes in position and/or orientation of the device 100 or the camera 102 (such as described for one or more operations of FIG. 7).

Each software module includes instructions that, when executed by the processor 120, cause the device 100 to perform the corresponding functions. The non-transitory computer-readable medium of the memory 130 thus includes instructions for performing all or a portion of the operations described with respect to FIG. 7.

The processor 120 may be any suitable one or more processors capable of executing scripts or instructions of one or more software programs stored in the device 100 (e.g., within the memory 130). In some implementations, the processor 120 may include or form one or more stages of an image processing pipeline. The processor 120 may execute the image reception SW module 132 to receive images provided by the camera 102, to receive images provided by another device, and/or to generate one or more preview images of a scene.

The processor 120 may execute the imaging SW module 133 to capture and process images provided by the camera 102, to capture and process preview images sensed by the image sensor 104, and to generate an HDR image based on a number of LDR images captured or provided by the camera 102. In addition, or in the alternative, the imaging SW module 133 may be executed to automatically capture the preview image based on the similarity value exceeding a threshold value.

The processor 120 may execute the translucent background image SW module 134 to generate a translucent image based on a reference image, and to present the translucent image as a translucent background on the display 140.

The processor 120 may execute the similarity SW module 135 to determine a similarity value between a preview image presented on the display 140 and the translucent background image presented on the display 140, and to dynamically adjust the similarity value based on changes in position and/or orientation of the device 100 or the camera 102 relative to the scene. The processor 120 may also execute the similarity SW module 135 to present the similarity value on the display 140, for example, to assist the user in aligning the preview image of the scene with the translucent background image (and thereby assist the user in aligning the preview image with the selected reference image). In some implementations, the similarity value may include one or more of a horizontal similarity value, a vertical similarity value, and a rotational similarity value. In some aspects, the horizontal similarity value may indicate a horizontal offset between the preview image and the translucent background image, the vertical similarity value may indicate a vertical offset between the preview image and the translucent background image, and the rotational similarity value may indicate a rotational offset between the preview image and the translucent background image.

The processor 120 may execute the directional indicator SW module 136 to generate a number of directional indicators for presentation on the display 140, for example, to assist a user in aligning the preview image with the translucent background image on the display 140. In some implementations, execution of the directional indicator SW module 136 may cause one or more of a horizontal directional indicator, a vertical directional indicator, and a rotational directional indicator to be presented on the display 140. The horizontal directional indicator may be based on the horizontal similarity value, the vertical directional indicator may be based on the vertical similarity value, and the rotational indicator may be based on the rotational similarity value.

The processor 120 may execute the image alignment SW module 137 to adjust an alignment between the preview image and the translucent background image presented on the display 140 based on changes in position and/or orientation of the camera 102.

The term "device" is not limited to one or a specific number of physical objects (such as one smartphone). As used herein, a device may be any electronic device with multiple parts that may implement at least some portions of this disclosure. While the below description and examples use the term "device" to describe various aspects of this disclosure, the term "device" is not limited to a specific configuration, type, or number of objects.

In accordance with aspects of the present disclosure, the device 100 may assist users in determining the vantage point from which an image of a scene was captured so that additional images of the scene can be captured from the same vantage point. In some implementations, a user may select or designate an image of a scene captured from a specific vantage point (such as from a specific distance, location, and/or angle) as a reference image. The device 100 may present the reference image of the scene as a translucent background image (or as a translucent background) on the display 140, and may present the preview image of the scene over the translucent background image so that the user can adjust a position and/or orientation of the device 100 or the camera 102 until the preview image is visually aligned with the translucent background image presented on the display 140. In this manner, the device 100 may assist the user to find or determine the specific vantage point from which the reference image was captured. In some aspects, the device 100 may compare the preview image with the reference image to generate a similarity value indicative of a degree of similarity or correlation between the preview image and the translucent background image. The similarity value may be presented on the display 140 to further assist the user in aligning the preview image with the translucent background image presented on the display 140.

Figure 2:
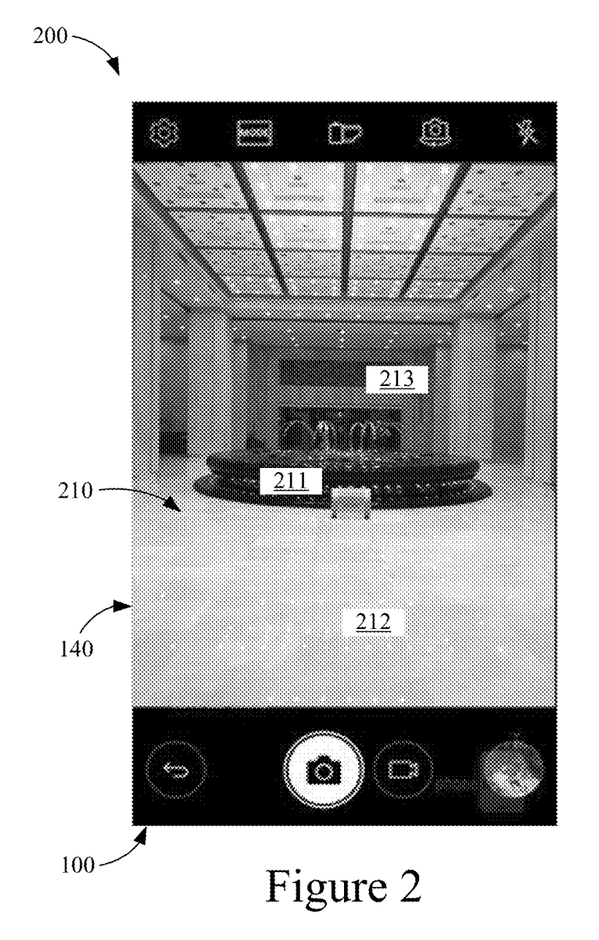
FIG. 2 is an illustration depicting an image of a scene presented on a display of a mobile device.

FIG. 2 is an illustration 200 depicting an example image 205 of a scene presented on the display 140 of the device 100. The image 210 is shown to include a subject portion 211 (a circular table) generally centered in a foreground portion 212 of the image 210, and includes a background portion 213 behind the subject portion 211. The image 210 may be captured by the camera 102 of the device 100 and stored in memory (such as in the image and parameters database 131). The subject portion 211 may be characterized by one or more image characteristics including, for example, as being a certain distance from the camera 102, as being of a certain sharpness, as being at a certain spatial location within the image 210, and so on. Similarly, the foreground portion 212 may be characterized by one or more image characteristics including, for example, as being a certain distance from the camera 102, as being of a certain sharpness, as being at a certain spatial location within the image 210, and so on. The background portion 213 may be characterized by one or more image characteristics including, for example, as having a smaller dynamic range than the subject portion 211 (and/or the foreground portion 212), as being more out-of-focus (less sharp) than the subject portion 211 (and/or the foreground portion 212), as being further from the camera 102 than the subject portion 211 (and/or the foreground portion 212), and so on.

After the image 210 is captured by the device 100, the user may wish to determine the specific vantage point from which the image 210 was captured, for example, so that the user may capture additional images of the scene from the same vantage point. In some implementations, the user may select the image 210 as a reference image, and the device 100 may present the reference image as a translucent background image on the display 140.

Figure 3A:
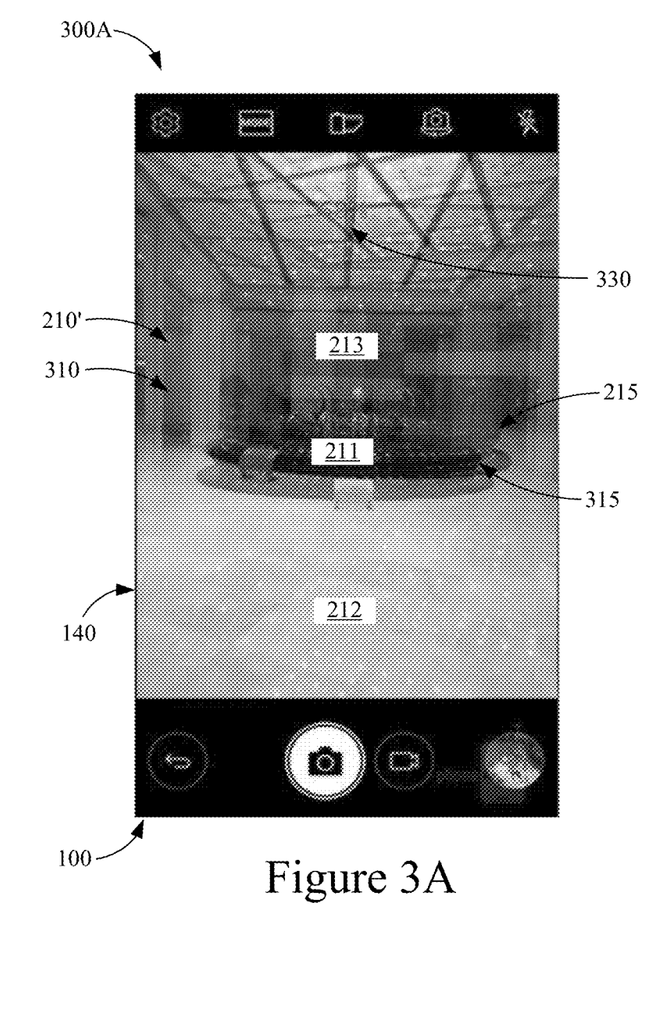
FIG. 3A is an illustration depicting a preview image of a scene displayed over a translucent background image presented on the display of the mobile device.

FIG. 3A is an illustration 300A depicting an example preview image 310 of the scene displayed over a translucent background image 210' presented on the display 140 of the device 100. In some implementations, the translucent background image 210' is a translucent version of the image 210 of FIG. 2 presented as the background on the display 140. By presenting the preview image 310 over the translucent background image 210' on the display 140, the device 100 may assist the user in adjusting the position and/or orientation of the device 100 or the camera 102 until the preview image 310 is visually aligned with the translucent background image 210' presented on the display 140.

As shown in the illustration 300A, the preview image 310 is not aligned with the translucent background image 210' such that objects in the preview image 310 may be offset from corresponding objects in the translucent background image 210'. For example, a circular table 315 appearing in the preview image 310 is offset to the right and downwards relative to a corresponding circular table 215 appearing in the translucent background image 210'.

In some implementations, the device 100 may present, on the display 140, a similarity value 330 indicative of a degree of similarity or correlation between the preview image 310 and the translucent background image 210'. The similarity value 330 may be generated using any suitable imaging similarity or correlation technique, for example, by comparing one or more parameters or characteristics of the preview image 310 with one or more parameters or characteristics of the reference image 210. In some implementations, the device 100 may determine the similarity value between the preview image 310 and the translucent background image 210' by comparing histograms of the preview image 310 and the reference image 210 using any suitable histogram equalization technique. In some aspects, the device 100 may compare the histogram of the preview image 310 with the histogram of the reference image 210 for a number of different channels or light frequencies (e.g., red, green, and blue) to generate the similarity value. In some implementations, the device 100 may use the following equation to determine the similarity value:

$$d(H_1, H_2) = \sqrt{1 - \frac{1}{\sqrt{H_1 H_2 N^2}} \sum_I \sqrt{H_1(I) \cdot H_2(I)}}$$

where $H_1$ is the histogram of the reference image 210, and $H_2$ is the histogram of the preview image 310. For the example illustration 300A of FIG. 3A, a similarity value 330 between the preview image 310 and the translucent background image 210' presented on the display 140 is 68%.

The device 100 may present any number of similarity values on the display 140. Thus, although the example illustration 300A of FIG. 3A depicts a single similarity value 330 presented on the display 140, the device 100 may present additional similarity values on the display 140. In some implementations, the similarity value may include one or more of a horizontal similarity value, a vertical similarity value, and a rotational similarity value. The horizontal similarity value may indicate a horizontal offset between the preview image 310 and the translucent background image 210', the vertical similarity value may indicate a vertical offset between the preview image 310 and the translucent background image 210', and the rotational similarity value may indicate a rotational offset between the preview image 310 and the translucent background image 210'. In some aspects, the user may use the similarity value(s) 330 presented on the display 140 to determine a particular position and/or orientation of the device 100 that achieves the highest degree of similarity between the preview image 310 and the translucent background image 210'. The user may also use the similarity value(s) 330 presented on the display 140 to determine the specific vantage point from which the reference image 210 of the scene was captured.

In addition, or in the alternative, the device 100 may present a number of directional indicators on the display 140 to further assist the user in aligning the preview image 310 with the translucent background image 210'. In some implementations, the device 100 may present one or more of a horizontal directional indicator, a vertical directional indicator, and a rotational indicator on the display 140. The horizontal directional indicator may indicate a direction of horizontal offset between the preview image 310 and the translucent background image 210', and may be based on the horizontal similarity value. The vertical directional indicator may indicate a direction of vertical offset between the preview image 310 and the translucent background image 210', and may be based on the vertical similarity value. The rotational indicator may indicate a direction of rotational offset between the preview image 310 and the translucent background image 210', and may be based on the rotational similarity value.

Figure 3B:
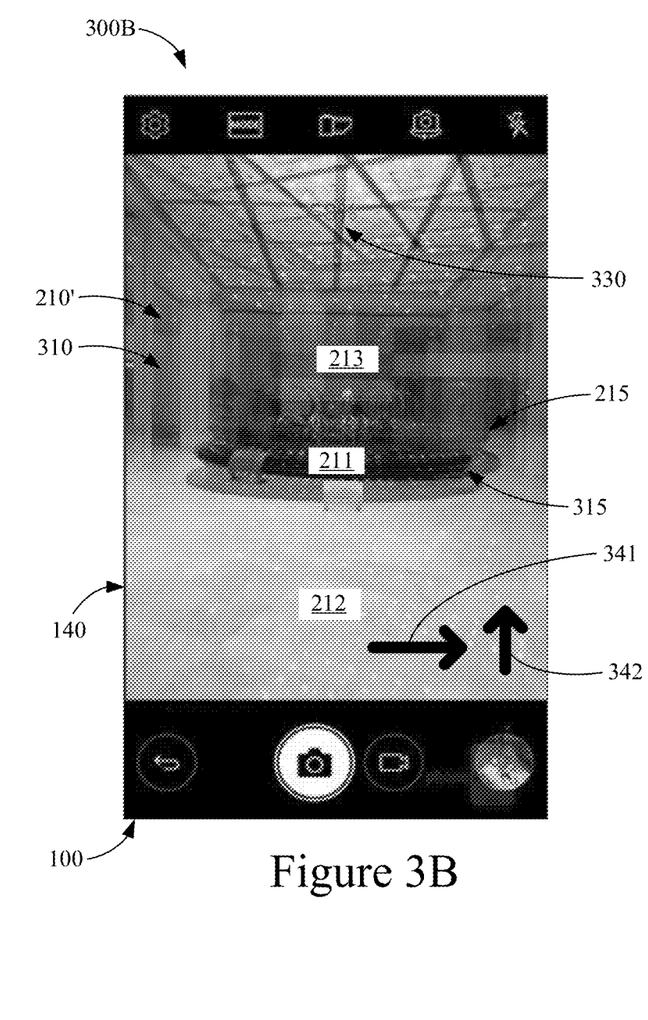
FIG. 3B is an illustration depicting directional indicators presented on the preview image of FIG. 3A.

FIG. 3B is an illustration 300B depicting a horizontal directional indicator 341 and a vertical directional indicator 342 displayed on the preview image 310 of FIG. 3A. Although not shown in FIG. 3B for simplicity, the device 100 may also present a rotational indicator on the display 140. As depicted in the illustration 300B of FIG. 3B, the horizontal directional indicator 341 may indicate that the preview image 310 is horizontally offset from the translucent background image 210' to the left, and may indicate that the user can increase the degree of similarity between the preview image 310 and the translucent background image 210' by re-positioning the device 100 in a manner that moves the preview image 310 to the right relative to the translucent background image 210' (as indicated by the right-pointing horizontal directional indicator 341). The vertical directional indicator 342 may indicate that the preview image 310 is vertically offset from the translucent background image 210' in the downward direction, and may indicate that the user can increase the degree of similarity between the preview image 310 and the translucent background image 210' by re-positioning the device 100 in a manner that moves the preview image 310 upwards relative to the translucent background image 210' (as indicated by the upward-pointing vertical directional indicator 342).

The device 100 may adjust the alignment between the preview image 310 and the translucent background image 210' based on changes in position and/or orientation of the camera 102 (such as in response to the user altering the position and/or the orientation of the device 100 relative to the scene, for example, to change the vantage point from which the preview image 310 is generated). The device 100 may also dynamically update the similarity value 330 based on the adjusted alignment, and may present the updated similarity value 330 on the display 140 to assist the user in aligning the preview image 310 with the translucent background image 210' presented on the display 140. In some implementations, the device 100 may increase the similarity value 330 when the user adjusts the position and/or the orientation of the camera 102 in a manner that increases the degree of alignment or correlation between the preview image 310 and the translucent background image 210', and may decrease the similarity value 330 when the user adjusts the position and/or the orientation of the camera 102 in a manner that decreases the degree of alignment or correlation between the preview image 310 and the translucent background image 210'.

In some implementations, the user may continue adjusting the position and/or orientation of the device 100 until the similarity value exceeds a threshold value. The threshold value may indicate an acceptable degree of similarity or correlation (or alignment) between the preview image 310 and the translucent background image 210' presented on the display 140. In addition, or in the alternative, the device 100 may be configured to automatically capture the preview image 310 when the similarity value exceeds the threshold value. In some aspects, the device 100 may be configured to automatically capture a plurality of preview images 310 using different exposure values when the similarity value exceeds the threshold value.

Figure 4A:
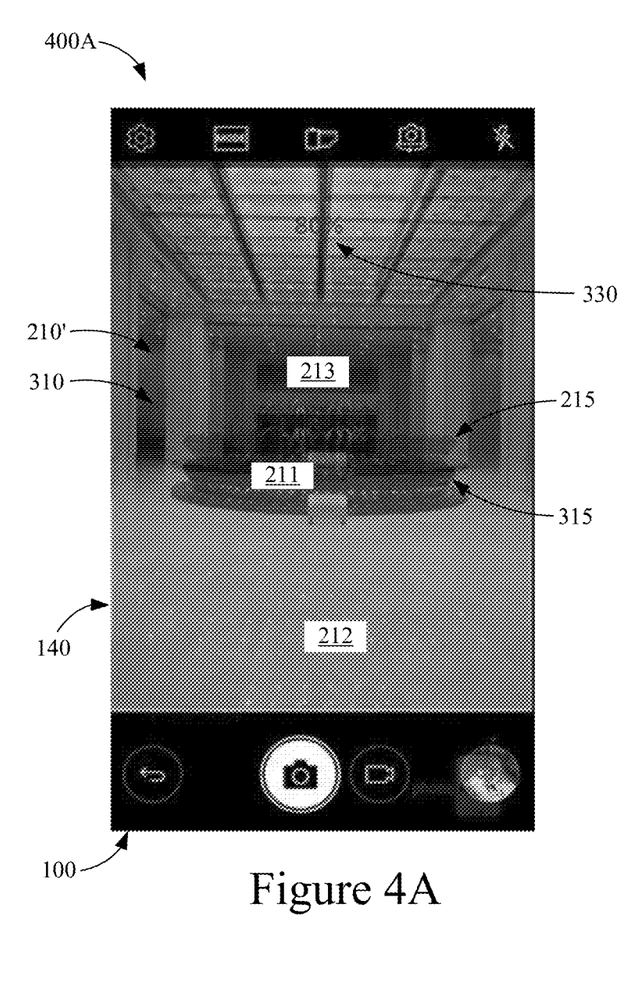
FIG. 4A is another illustration depicting the preview image of the scene displayed over the translucent background image presented on the display of the mobile device.

For example, FIG. 4A is another illustration 400A depicting the preview image 310 of the scene displayed over the translucent background image 210' presented on the display 140 of the device 100. As shown in the illustration 400A, the user has re-positioned the device 100 in a manner that has increased the degree of similarity or correlation between the preview image 310 and the translucent background image 210' (as compared to the example illustration 300A of FIG. 3A). In some implementations, the device 100 may move, rotate, and/or re-size the preview image 310 relative to the translucent background image 210' as the user adjusts the position and/or the orientation of the device 100 in a manner that changes the vantage point from which the preview image 310 is generated. As depicted in FIG. 4A, the preview image 310 is now horizontally aligned (or at least substantially horizontally aligned) with the translucent background image 210' such that the circular table 315 in the preview image 310 is horizontally aligned (or at least substantially horizontally aligned) with the corresponding circular table 215 in the translucent background image 210'. Although the circular table 315 in the preview image 310 remains offset in the upward direction relative to the corresponding circular table 215 in the translucent background image 210', the similarity value 330 has increased from 68% to 80%, for example, to reflect the greater degree of similarity or correlation between the preview image 310 and the translucent background image 210' caused by the user changing the vantage point from which the preview image 310 is generated (as compared with the degree of similarity between the preview image 310 and the translucent background image 210' shown in the illustration 300A of FIG. 3A).

Figure 4B:
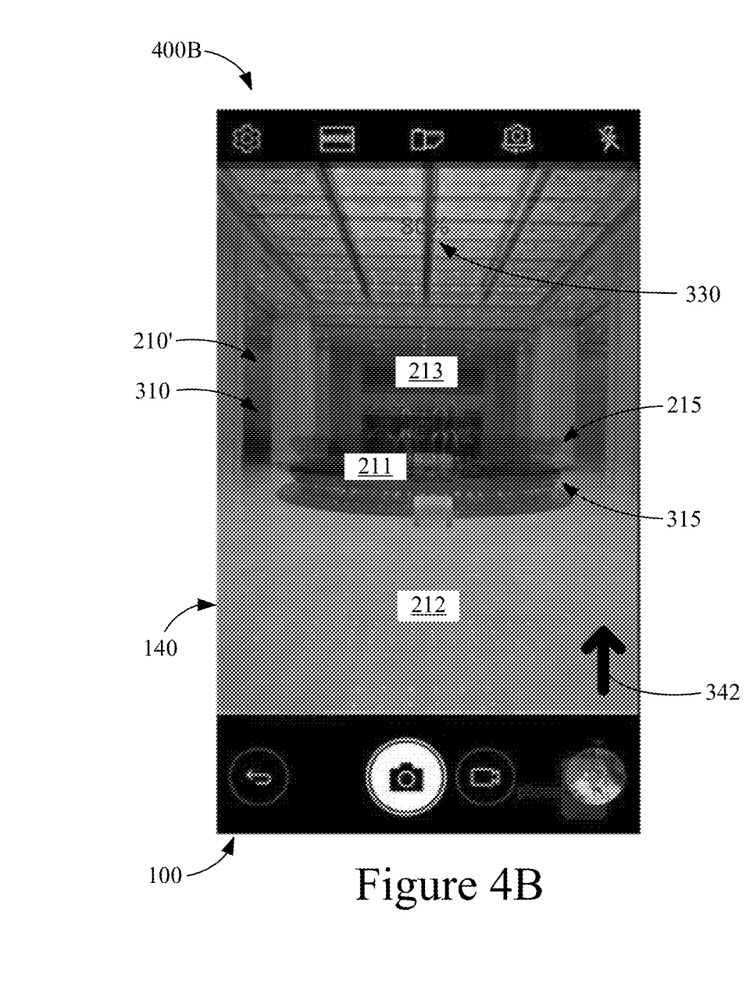
FIG. 4B is an illustration depicting directional indicators presented on the preview image of FIG. 4A.

FIG. 4B is an illustration 400B depicting the vertical directional indicator 342 displayed on the preview image 310 of FIG. 4A. The horizontal directional indicator 341 may not be displayed on the preview image 310 of FIG. 4A based on a horizontal alignment between the preview image 310 and the translucent background image 210'. As depicted in the illustration 400B of FIG. 4B, the vertical directional indicator 342 may indicate that the preview image 310 remains vertically offset from the translucent background image 210' in the downward direction, and may indicate that the user can increase the degree of similarity between the preview image 310 and the translucent background image 210' by re-positioning the device 100 in a manner that moves the preview image 310 upwards relative to the translucent background image 210' (as indicated by the upward-pointing vertical directional indicator 342).

Figure 5A:
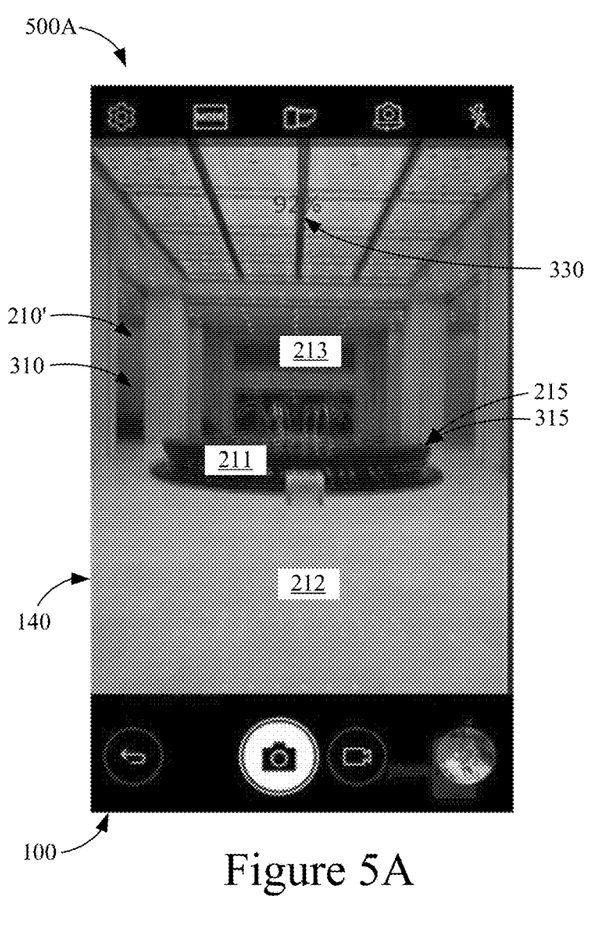
FIG. 5A is another illustration depicting the preview image of the scene displayed over the translucent background image presented on the display of the mobile device.

As the user re-positions the device 100 in a manner that increases the vertical alignment between the preview image 310 and the translucent background image 210', the similarity value 330 may increase (such as compared with the similarity value 330 presented on the display 140 in FIG. 4A). For example, FIG. 5A is another illustration 500A depicting the preview image 310 of the scene displayed over the translucent background image 210' presented on the display 140 of the device 100. As shown in the illustration 500A, the user has re-positioned the device 100 in a manner that changes the vantage point from which the preview image 310 is generated (as compared to the example illustration 400A of FIG. 4A). The device 100 may move, rotate, and/or re-size the preview image 310 relative to the translucent background image 210' as the user adjusts the position and/or the orientation of the device 100 in a manner that changes the vantage point from which the preview image 310 is generated. As depicted in FIG. 5A, the preview image 310 is now vertically aligned (or at least substantially vertically aligned) with the translucent background image 210' such that the circular table 315 in the preview image 310 is vertically aligned (or at least substantially vertically aligned) with the corresponding circular table 215 in the translucent background image 210.' For the example illustration 500A, the device 100 has increased the similarity value 330 from 80% to 92%, for example, to reflect the greater degree of similarity or correlation between the preview image 310 and the translucent background image 210' caused by the user changing the vantage point from which the preview image 310 is generated (as compared with the degree of similarity between the preview image 310 and the translucent background image 210' shown in the illustration 400A of FIG. 4A).

Figure 5B:
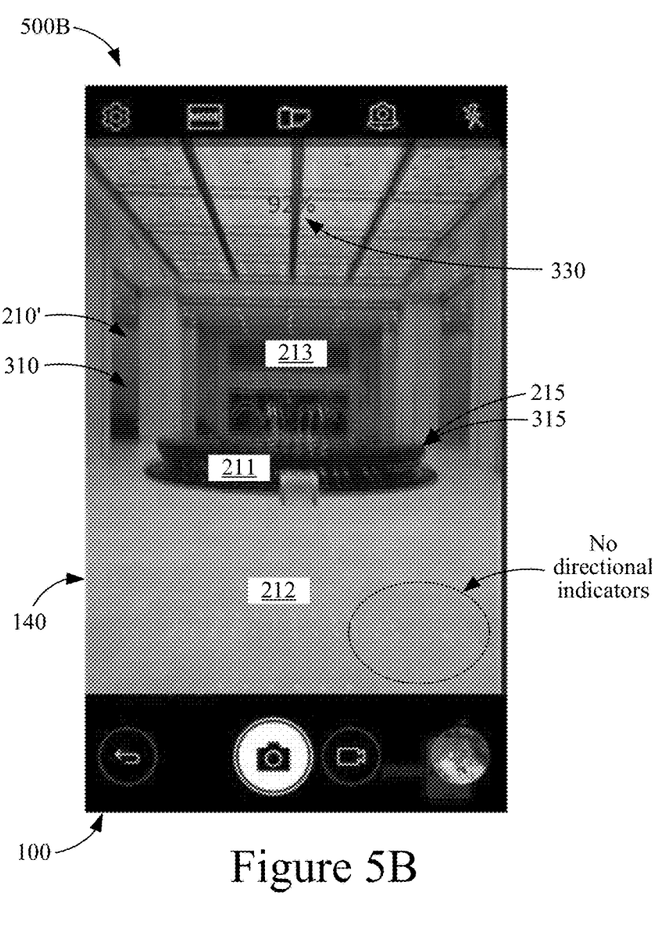
FIG. 5B is an illustration depicting an absence of directional indicators presented on the preview image of FIG. 5A.

In some implementations, the device 100 may not present any directional indicators on the display 140 when the similarity value 330 exceeds the threshold value. For example, FIG. 5B is an illustration 500B depicting an absence of directional indicators presented on the preview image 310 of FIG. 5A. For purposes of discussion herein, the threshold value is less than 92%, and thus the similarity value 330 presented on the preview image 310 of FIG. 5A is greater than the threshold value, which may indicate that the degree of similarity or correlation between the preview image 310 and the translucent background image 210' is acceptable. In some implementations, the device 100 may inform the user that the degree of similarity between the preview image 310 and the translucent background image 210' is acceptable, which in turn may indicate that the vantage point from which the preview image 310 is generated is the same as (or at least substantially similar to) the vantage point from which the reference image 210 was captured. In this manner, the user may determine the vantage point from which the reference image 210 was captured.

In addition, or in the alternative, the device 100 may automatically capture a number of additional images of the scene when the similarity value 330 exceeds the threshold value. In some implementations, the device 100 may select the number of additional images to be captured and/or may automatically capture at least some of the additional images using different exposure values so that the additional images may be used to generate a HDR image of the scene. In other implementations, the user may select the number of additional images to be captured and/or may select different exposure values for some or all of the additional captured images.

The device 100 may alert the user that the similarity value 330 has exceeded the threshold value in any suitable manner including (but not limited to) an audio alert, a visual alert, a vibration alert, and the like. In some implementations, the device 100 may present a notification on the display 140 to indicate the acceptable degree of similarity between the preview image 310 and the translucent background image 210'. In some aspects, the notification may be displayed over the preview image 310 presented on the display 140. In other aspects, the notification may be presented in another suitable location or area of the display 140 (such as in a status bar of the display 140 or along an edge of the display 140).

Figure 6:
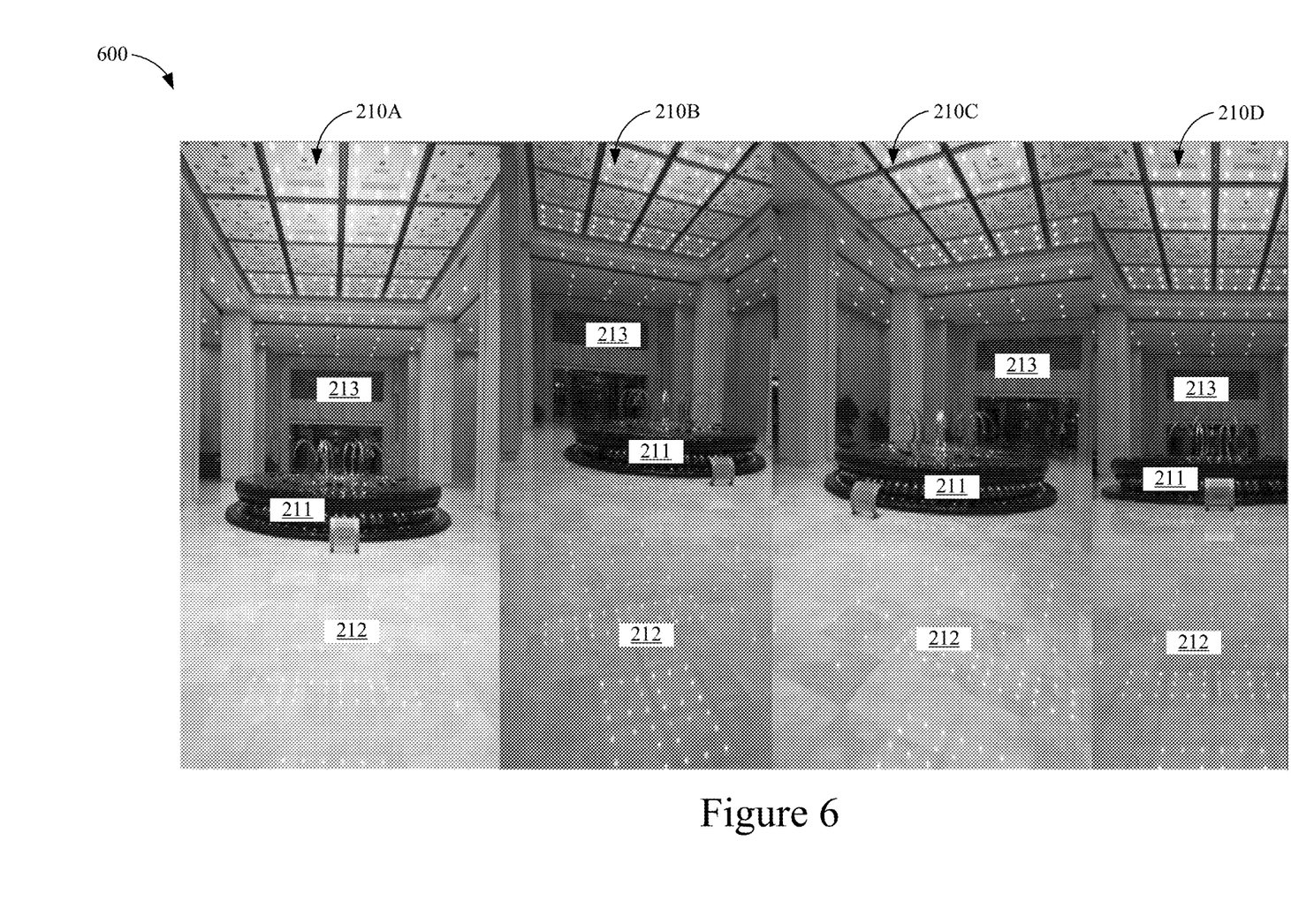
FIG. 6 is an illustration depicting images of a scene viewed from different vantage points.

FIG. 6 is an illustration 600 depicting images 210A-210D of the same scene viewed from different vantage points. The image 210A is generated from a vantage point that is directly in front of the scene. In some aspects, the image 210A may be or correspond to the reference image 210 shown in FIG. 2. The image 210B is generated from a vantage point that is offset to the left of the scene, and may provide a field of view that is offset to the left relative to the field of view provided by the image 210A. The image 210C is generated from a vantage point that is offset to the right of the scene, and may provide a field of view that is offset to the right relative to the field of view provided by the image 210A. The image 210D is generated from a vantage point that is offset in a downward direction relative to the scene, and may provide a field of view that is offset in the downward direction relative to the field of view provided by the image 210A.

FIG. 7 is an illustrative flow chart depicting an example operation 700 for capturing an image of a scene. In some implementations, the example operation 700 may be used to align a preview image of a scene with a reference image of the scene presented as a translucent background image on a display of a mobile device. In some aspects, a user may select the reference image of the scene, and may use an alignment between the preview image and the translucent background image to determine the vantage point from which the reference image of the scene was captured. Although the example operation 700 is described with respect to the device 100 of FIG. 1, the example operation 700 may be performed by other suitable devices, cameras, or imaging devices.

An image of a scene may be selected as a reference image (701). In some implementations, the user may select one of a number of captured images of the scene stored in the device 100 as the reference image. In other implementations, the device 100 may select the reference image.

The device 100 may present the reference image as a translucent background image on the display 140 (702). In some implementations, the device 100 may generate a translucent image based on the reference image selected by the user, and may present the translucent image as the translucent background image on the display 140.

The device 100 may display a preview image of the scene over the translucent background image presented on the display 140 (703). In some implementations, the preview image may be displayed over (such as on top of or overlaid onto) the translucent background image so that the user can visually determine the degree to which the preview image is aligned with the translucent background image (and thus the degree to which the preview image is aligned with the reference image). In some aspects, the device 100 may use an initial or default group of settings to capture and generate the preview image. For example, an initial exposure value (such as an initial shutter speed, camera sensor sensitivity, and/or aperture size), an initial focus setting, and an initial white balance setting may be used by the camera 102 of the device 100 to capture the preview image.

The device 100 may determine a similarity value between the preview image and the translucent background image (704). The device 100 may determine the similarity value by comparing one or more parameters or characteristics of the preview image with one or more parameters or characteristics of the reference image. In some implementations, the device 100 may determine a degree of similarity or correlation between the preview image and the translucent background image based on a comparison of histograms of the preview image and the reference image. In some aspects, the device 100 may compare the histogram of the preview image with the histogram of the reference image for a number of different channels or light frequencies (such as red, green, and blue). The device 100 may use any suitable histogram equalization technique to determine the degree of similarity or correlation between the preview image and the reference image.

In some implementations, the device 100 may present the similarity value on the display (705). The similarity value may indicate a degree of similarity between the preview image and the translucent background image, and may indicate the degree to which the preview image is aligned with the translucent background image. In some aspects, the user may determine the vantage point from which the reference image was captured based on the similarity value. In some implementations, the device 100 may present a single similarity value on the display 140 (such as depicted in the illustrations of FIGS. 3A-3B, 4A-4B, and 5A-5B).

In other implementations, the device 100 may present multiple similarity values on the display 140. For example, the device 100 may present one or more of a horizontal similarity value, a vertical similarity value, and a rotational similarity value on the display 140. The horizontal similarity value may indicate a horizontal offset between the preview image and the translucent background image, the vertical similarity value may indicate a vertical offset between the preview image and the translucent background image, and the rotational similarity value may indicate a rotational offset between the preview image and the translucent background image.

In addition, or in the alternative, the device 100 may present one or more directional indicators on the display 140 based on the similarity value (706). In some implementations, the device 100 may present one or more of a horizontal directional indicator, a vertical directional indicator, and a rotational indicator on the display 140. The horizontal directional indicator may be based on the horizontal similarity value, the vertical directional indicator may be based on the horizontal similarity value, and the rotational indicator may be based on the rotational similarity value.

The device 100 may adjust an alignment between the preview image and the translucent background image based on changes in position and orientation of the device 100 (707). For example, as the user adjusts the position and/or the orientation of the device 100 or the camera 102 in a manner that changes the vantage point from which the preview image is generated, the device 100 may move, rotate, and/or re-size the preview image relative to the translucent background image presented on the display 140.

The device 100 may dynamically update the similarity value based on the adjusted alignment (708). In some implementations, when the alignment between the preview image and the translucent background image changes based on the user adjusting the position and/or the orientation of the device 100 or the camera 102, the device 100 may determine updated similarity values and present the updated similarity values on the display 140. For example, when the user adjusts the position and/or the orientation of the camera 102 in a manner that increases the degree of similarity or correlation between the preview image and the translucent background image (such that the preview image and the translucent background image presented on the display 140 become more aligned with each other), the device 100 may increase the similarity value and present the increased similarity value on the display 140. Conversely, when the user adjusts the position and/or the orientation of the camera 102 in a manner that decreases the degree of similarity or correlation between the preview image and the translucent background image (such that the preview image and the translucent background image presented on the display 140 become less aligned with each other), the device 100 may decrease the similarity value and present the decreased similarity value on the display 140.

In some implementations, the device 100 may automatically capture the preview image based on the similarity value exceeding a threshold value (709). In some aspects, the device 100 may be configured to capture a plurality of preview images of the scene using different exposure values when the similarity value exceeds the threshold value. The plurality of preview images captured using different exposure values may be combined to generate an HDR image of the scene.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of capturing images in a mobile device, comprising:
    selecting an image of a scene as a reference image;
    presenting the reference image as a translucent element on a display of the mobile device;
    displaying a preview stream of preview images of the scene aligned with the translucent element presented on the display;
    determining a horizontal offset value between one or more preview images of the preview stream and the translucent element;
    determining a vertical offset value between the one or more preview images and the translucent element;
    determining a rotational offset value between the one or more preview images;
    presenting, on the display, a first similarity value associated with the rotational offset value and at least one of a second similarity value associated with the horizontal offset value or a third similarity value associated with the vertical offset value; and
    presenting, on the display based on the horizontal offset value and the vertical offset value, at least one directional indicator.

2. The method of claim 1, further comprising:
    determining a vantage point from which the reference image was captured based, at least in part, on the horizontal offset value and the vertical offset value.

3. The method of claim 1, further comprising:
    adjusting an alignment between the one or more preview images and the translucent element based on changes in position and orientation of the mobile device; and
    dynamically updating at least one of the horizontal offset value or the vertical offset value based on the adjusted alignment.

4. The method of claim 3, further comprising:
    automatically capturing the one or more preview images based on at least one of the first similarity value or the second similarity value exceeding a threshold value.

5. The method of claim 1, wherein determining the horizontal offset value and the vertical offset value comprises:
    comparing a histogram of the one or more preview images with a histogram of the reference image.

6. The method of claim 1, further comprising presenting, on the display, a rotational indicator based on the rotational offset value.

7. The method of claim 1, wherein the rotational offset value indicates a rotational offset between the one or more preview images and the translucent element.

8. A mobile device configured to capture images, comprising:
    a display;
    one or more processors; and
    a memory storing instructions that, when executed by the one or more processors, cause the mobile device to:
        select an image of a scene as a reference image;
        present the reference image as a translucent element on the display;
        display a preview stream of preview images of the scene aligned with the translucent element presented on the display;
        determine a horizontal offset value between one or more preview images of the preview stream and the translucent element;
        determine a vertical offset value between the one or more preview images and the translucent element;
        determine a rotational offset value between the one or more preview images;
        present, on the display, a first similarity value associated with the rotational offset value and at least one of a second similarity value associated with the horizontal offset value or a third similarity value associated with the vertical offset value; and
        presenting, on the display based on at least one of the horizontal offset value or the vertical offset value, at least one directional indicator.

9. The mobile device of claim 8, wherein execution of the instructions further causes the mobile device to:
    determine a vantage point from which the reference image was captured based, at least in part, on the horizontal offset value and the vertical offset value.

10. The mobile device of claim 8, wherein execution of the instructions further causes the mobile device to:
    adjust an alignment between the one or more preview images and the translucent element based on changes in position and orientation of the mobile device; and
    dynamically update at least one of the horizontal offset value or the vertical offset value based on the adjusted alignment.

11. The mobile device of claim 10, wherein execution of the instructions further causes the mobile device to:
    automatically capture the one or more preview images based on at least one of the first similarity value or the second similarity value exceeding a threshold value.

12. The mobile device of claim 8, wherein execution of the instructions to determine the horizontal offset value and the vertical offset value causes the mobile device to:
    compare a histogram of the one or more preview images with a histogram of the reference image.

13. The mobile device of claim 8, wherein execution of the instructions further causes the mobile device to present, on the display, a rotational indicator based on the rotational offset value.

14. The mobile device of claim 8, wherein the rotational offset value indicates a rotational offset between the one or more preview images and the translucent element.

15. A non-transitory computer-readable medium storing one or more programs containing instructions that, when executed by one or more processors of an apparatus, cause the apparatus to perform operations comprising:
- selecting an image of a scene as a reference image;
- presenting the reference image as a translucent element on a display of the apparatus;
- displaying a preview stream of preview images of the scene aligned with the translucent element presented on the display;
- determining a horizontal offset value between one or more preview images of the preview stream and the translucent element;
- determining a vertical offset value between the one or more preview images and the translucent element;
- determining a rotational offset value between the one or more preview images;
- presenting, on the display, a first similarity value associated with the rotational offset value and at least one of a second similarity value associated with the horizontal offset value or a third similarity value associated with the vertical offset value; and
- presenting, on the display based on at least one of the horizontal offset value or the vertical offset value, at least one directional indicator.

16. The non-transitory computer-readable medium of claim 15, wherein execution of the instructions causes the apparatus to perform operations further comprising:
- determining a vantage point from which the reference image was captured based, at least in part, on the horizontal offset value and the vertical offset value.

17. The non-transitory computer-readable medium of claim 15, wherein execution of the instructions causes the apparatus to perform operations further comprising:
- adjusting an alignment between the one or more preview images and the translucent element based on changes in position and orientation of the apparatus; and
- dynamically updating at least one of the horizontal offset value or the vertical offset value based on the adjusted alignment.

18. The non-transitory computer-readable medium of claim 17, wherein execution of the instructions causes the apparatus to perform operations further comprising:
- automatically capturing the one or more preview images based on at least one of the first similarity value or the second similarity value exceeding a threshold value.

19. The non-transitory computer-readable medium of claim 15, wherein execution of the instructions for determining the horizontal offset value and the vertical offset value causes the apparatus to perform operations further comprising:
- comparing a histogram of the one or more preview images with a histogram of the reference image.

20. The non-transitory computer-readable medium of claim 15, wherein execution of the instructions causes the apparatus to present, on the display, a rotational indicator based on the rotational offset value.

21. The non-transitory computer-readable medium of claim 15, wherein the rotational offset value indicates a rotational offset between the one or more preview images and the translucent element.

22. An apparatus, comprising:
- means for selecting an image of a scene as a reference image;
- means for presenting the reference image as a translucent element on a display of the apparatus;
- means for displaying a preview stream of preview images of the scene aligned with the translucent element presented on the display;
- means for determining a horizontal offset value between one or more preview images of the preview stream and the translucent element;
- means for determining a vertical offset value between the one or more preview images and the translucent element;
- means for determining a rotational offset value between the one or more preview images;
- means for presenting, on the display, a first similarity value associated with the rotational offset value and at least one of a second similarity value associated with the horizontal offset value or a third similarity value associated with the vertical offset value; and
- means for presenting, on the display based on at least one of the horizontal offset value or the vertical offset value, at least one directional indicator.

23. The apparatus of claim 22, further comprising:
- means for adjusting an alignment between the one or more preview images and the translucent element based on changes in position and orientation of the apparatus; and
- means for dynamically updating at least one of the horizontal offset value or the vertical offset value based on the adjusted alignment.

* * * * *